US007391740B2

United States Patent
Khandani et al.

(10) Patent No.: US 7,391,740 B2
(45) Date of Patent: Jun. 24, 2008

(54) METHOD FOR QUANTIFYING REPONSIVENESS OF FLOW AGGREGATES TO PACKET DROPS IN A COMMUNICATION NETWORK

(75) Inventors: Mehdi K. Khandani, Lanham, MD (US); Mark A. Shayman, Potomac, MD (US)

(73) Assignee: University of Maryland, College Park, MD (US)

( * ) Notice: Subject to any disclaimer, the term of this patent is extended or adjusted under 35 U.S.C. 154(b) by 690 days.

(21) Appl. No.: 10/825,111

(22) Filed: Apr. 16, 2004

(65) Prior Publication Data

US 2004/0233846 A1  Nov. 25, 2004

(51) Int. Cl.
 *H04L 12/26* (2006.01)
(52) U.S. Cl. ...................................... 370/253
(58) Field of Classification Search .............. None
 See application file for complete search history.

(56) References Cited

U.S. PATENT DOCUMENTS

| 6,934,256 | B1* | 8/2005 | Jacobson et al. ............ 370/235 |
| 6,985,442 | B1* | 1/2006 | Wang et al. ................. 370/232 |
| 7,027,393 | B1* | 4/2006 | Cheriton .................. 370/230.1 |
| 7,203,169 | B1* | 4/2007 | Okholm et al. ............. 370/232 |
| 2002/0181494 | A1* | 12/2002 | Rhee ......................... 370/465 |
| 2004/0196790 | A1* | 10/2004 | Balakrishnan et al. ...... 370/232 |
| 2007/0064610 | A1* | 3/2007 | Khandani et al. ........... 370/235 |

OTHER PUBLICATIONS

W. Feng, et al., "The Blue Active Queue Management Algorithms", IEEE/ACM Transactions on Networking, vol. 10, No. 4, pp. 513-528, Aug. 2002.

S. Floyd, et al., "Promoting the Use of End-to End Congestion Control in the Internet", IEEE/ACM Transactions on Networking, vol. 7, No. 4, pp. 458-472, Aug. 1999.

S. Floyd, et al., "Random Early Detection Gateways for Congestion Avoidance", IEEE/ACM Transactions on Networking, vol. 1, No. 4, pp. 397-413, Aug. 1993.

V. Jacobson, "Congestion Avoidance and Control ", Proceedings of SIGCOMM 88, pp. 314-329, Aug. 1988.

(Continued)

*Primary Examiner*—Wing F. Chan
*Assistant Examiner*—Gregory B Sefcheck
(74) *Attorney, Agent, or Firm*—Rosenberg, Klein & Lee (57) ABSTRACT

In a communication network, the responsiveness of the transmission rate of data packets to packet drops is quantified for an aggregate of flows as opposed to on a per-flow basis. In an Aggregate Perturbation Method (APM), a small number of data packets is intentionally dropped from the aggregate at a switching node and a response thereto is measured. Traffic not conforming to the predetermined transmission control protocol may be discovered as a decrement in the reduction in traffic rate compared to that anticipated based on the rate of dropped packets. To prevent interference from the simultaneous application of APM at multiple switching nodes, an orthogonal drop rate signature defining the instantaneous drop rate is assigned thereto. The orthogonal drop rate signature is based on the code division multiple access (CDMA) coding of data, and for that reason, APM with the application of orthogonal drop rate signatures is termed CDMA-based APM, or CAPM. APM or CAPM may be utilized as a component in fair congestion control or in mitigating distributed denial of service (DDoS) attacks of the Internet.

20 Claims, 7 Drawing Sheets

OTHER PUBLICATIONS

S. Savage, et al., "Network Support for IP Traceback", IEEE/ACM Transactions on Networking, vol. 9, No. 3, pp. 226-237, Jun. 2001.

V. Mishra, et al., "Fluid-based Analysis of a Network of AQM Routers Supporting TCP Flows with an Application to RED", Proceedings of SIGCOMM 2000, pp. 151-160, Aug. 2000.

M. Kalantari, et al., "Using Transient Behavior to TCP in Mitigation of Distributed Denial of Service Attacks", Proceedings of IEEE Conference on Decision and Control, Las Vegas, Nevada, pp. 1422-1427, Dec. 2002.

R. Mahajan, et al., "Controlling High Bandwidth Aggregates in the Network", ACM SIGCOMM Computer Communications Review, vol. 32, No. 3, pp. 62-73, Jul. 2002.

E. Altman, et al., "A Stochastic Model of TCP/IP with Stationary Random Losses", Proceedings of SIGCOMM 2000, pp. 231-242, Aug. 2000.

* cited by examiner

METHOD FOR QUANTIFYING REPONSIVENESS OF FLOW AGGREGATES TO PACKET DROPS IN A COMMUNICATION NETWORK

BACKGROUND OF THE INVENTION

1. Field of the Invention

The invention described herein is related to determining the responsiveness of the data transmission rate in a communication network to packet drops or packet marking. More specifically, the present invention actively drops or marks packets of data from an aggregate of flows in a communication network and then measures the data traffic rate subsequent thereto. In so doing, the present invention can detect an amount of traffic not conforming to the transmission protocol of the aggregate.

2. Description of the Prior Art

In recent years, much research has been conducted to identify and model non-conforming traffic in a communication network operating under the Transmission Control Protocol (TCP). Most of the research in this field models the network traffic as individual flows under steady state conditions. Recently, it has been determined that much of the traffic in a wide area network such as the Internet is composed of so-called mice traffic, which, on a per-flow basis, is short-lived and sparse. However, when measured across all flows, the mice traffic accounts for a large percentage of traffic on the Internet. Thus, measuring traffic on a per-flow basis may lead to inaccurate estimates thereof or may require highly complex models for making approximations.

In the Journal paper "Promoting the Use of End-to-End Congestion Control in the Internet", (Floyd, S. and Fall, K.; IEEE/ACM Transactions on Networking, Vol. 7, No. 4, August 1999), the authors disclose a method of testing a TCP flow by comparing the steady state throughput thereof with a theoretical predicted value for conforming flows. If the test response is similar to the model output, the flow is considered to be TCP conforming. Thus, non-conforming flows may be identified and subsequently penalized in order to control congestion on the network. The disclosed method describes how large sustained individual flows may be tested for TCP conformance, however, as previously stated, the traffic on individual flows of the Internet consists of mice traffic, which is by no means a large sustained flow.

In the paper "The BLUE Active Queue Algorithms", (Wu-Chang, F., et al.; IEEE/ACM Transactions on Networking, Vol. 10, No. 4, August 2002), the authors disclose a Stochastic Fair BLUE (SFB) queue management algorithm which can identify and rate-limit non-responsive flows using a small amount of state information of the network. SFB provides a per-flow responsiveness test by mapping different flows to parallel bins. Those bins that become overloaded are considered to be receiving a non-conforming flow. However, if many non-conforming flows in a traffic aggregate exist, it is likely that all bins will become overloaded and the SFB algorithm will not be able to distinguish between conforming and non-conforming flows.

Thus, in view of the shortcomings of the prior art, there exists an apparent need for a technique to quantify the responsiveness to packet drops of network traffic that may not be in a large, sustained flow.

SUMMARY OF THE INVENTION

The method of the present invention obtains a responsiveness measure at the aggregate level, as opposed to the flow level measurements of the prior art. An aggregate is a group of flows with a common property that pass through the same router or switching device at some point in the network. For example, an aggregate can be defined as all FTP flows that pass through a router or may be defined as all traffic being routed toward a specific web server.

The present invention measures the responsiveness of an aggregate by measuring the arrival rate thereof and intentionally dropping a small number of packets to observe the aggregate's response thereto. In a network operating under the transmission control protocol (TCP), an aggregate undergoes a transient degradation in data rate as a result of instantaneous packet drops. This degradation is measured as the responsiveness measure. The active measurement, i.e., intentionally dropping packets from an aggregate to measure the response thereto is to be known as the Aggregate Perturbation Method (APM).

The method of the present invention determines the responsiveness of data flows to packet drops in a communication network by first selecting at least one common aggregating property at each of a plurality of switching nodes of the network. An aggregate of flows is formed for each aggregating property at each switching node. Once the aggregates have been formed, the unperturbed packet transmission rate for each aggregate is obtained either by measurement of the aggregate when it is known that the aggregate is conforming to a predetermined protocol or is estimated by a long-term average of the total traffic of the flows in the aggregate. A packet drop rate for the aggregate is set, a number of packets in accordance therewith are dropped from the aggregate and the perturbed packet transmission rate is then measured for the aggregate. The responsiveness measure is then calculated from the difference between the perturbed packet transmission rate and the unperturbed packet transmission rate.

In one aspect of the present invention, the packet drop rate is set in accordance with a drop rate signature, whereby the drop rate signature at each router or switching node in the network is orthogonal to the drop rate signatures of all other switching nodes in the network. This aspect of the invention allows multiple routers or switching devices to conduct the perturbation method simultaneously and without interference from the perturbations of the other switching nodes.

In another aspect of the present invention, the method determines the amount of traffic in a network that is not conforming to a predetermined transmission control protocol. First, the method selects at least one common aggregating property at each of a plurality of switching nodes of the network and an aggregate of flows is formed for each aggregating property at each switching node. Once the aggregates have been formed, the unperturbed packet transmission rate for each aggregate is obtained either by measurement of the aggregate when it is known that the aggregate is conforming to a predetermined protocol or is estimated by a long-term average of the total traffic of the flows in the aggregate. A packet drop rate for the aggregate is set and a number of packets in accordance with the packet drop rate are dropped from the aggregate. A perturbed packet transmission rate is then measured for the aggregate and a responsiveness coefficient for each aggregate is estimated from the difference between the perturbed packet transmission rate and the unperturbed packet transmission rate. The amount of non-conforming traffic is calculated as a ratio of the responsiveness coefficient to the unperturbed packet transmission rate.

DETAILED DESCRIPTION OF THE PREFERRED EMBODIMENTS

Figures 1, 2:
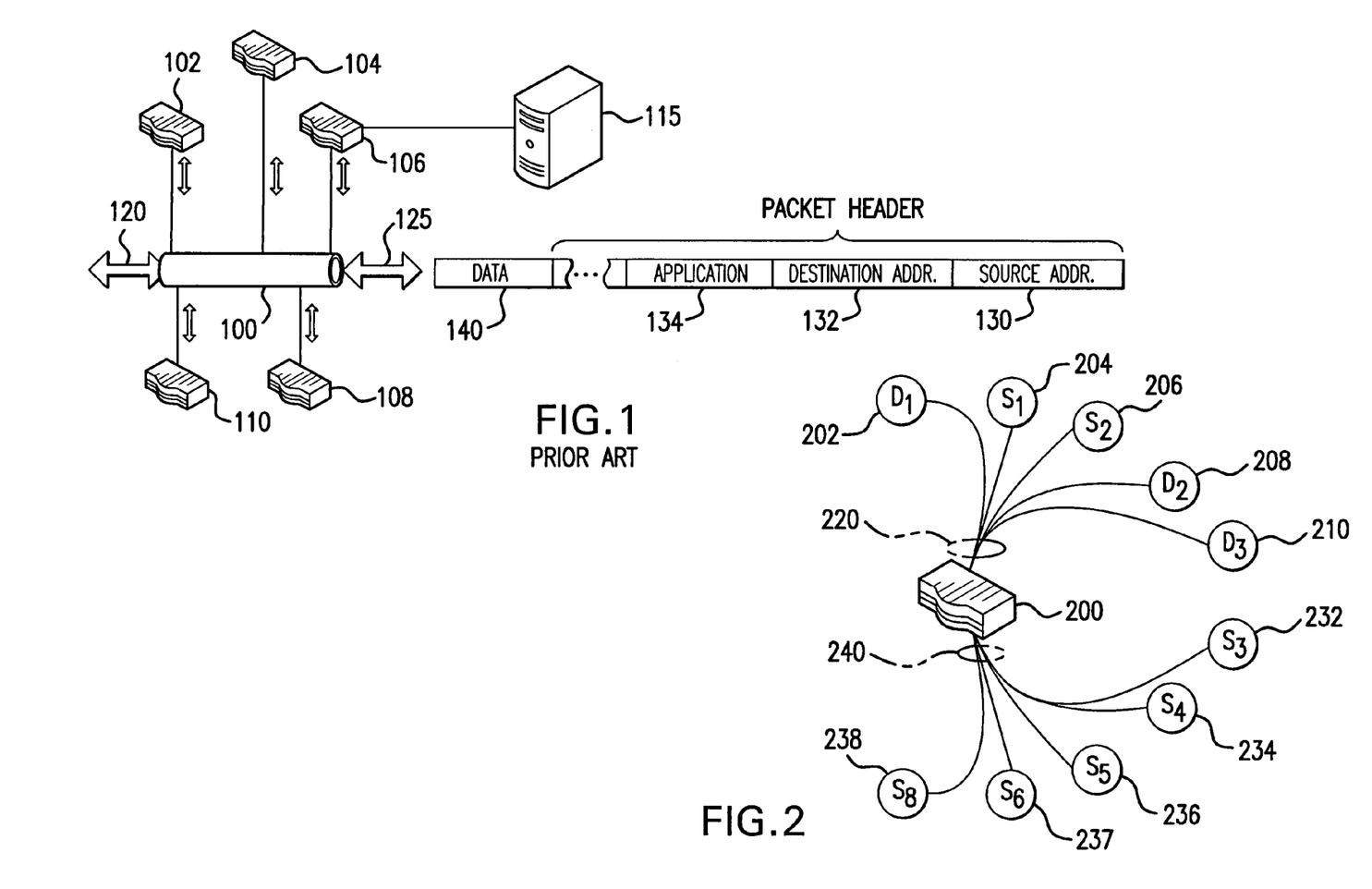
FIG. 1 is an illustration of key components in a communication network of the prior art.
FIG. 2 is an illustration of the grouping of flows into aggregates in accordance with the present invention.

Referring to FIG. 1, there is diagrammatically shown several key components of a communications network. For the purposes of describing the present invention and not for limiting the scope thereof, the network of FIG. 1 is assumed to be the Internet operating under the TCP/IP (Transmission Control Protocol/Internet Protocol). At any section 100 of the network, a plurality of data flows 120 enters and a plurality of data flows 125 exits. A flow is a stream of data packets with the same source and destination and which are transported along the same path.

At the same portion 100 of the network of FIG. 1, one or more routers 102, 104, 106, 108, and 110 or other switching devices may be coupled to the network to forward the data packets towards their final destination. As is known in the art, this is possible in that a data packet will include a packet designator, e.g., a packet header, which maintains the information necessary to route the packet to its destination such as server 115. An exemplary packet header includes a source address 130 (which may include a source port number), destination address 132 (which may include a destination port number, and an application type 134. Whereas, the application type is shown in FIG. 1 as a distinct field within the packet header, the application type may also be derived from portions of other fields within the header. For example, in TCP, the application type may be derived, in many cases, from the source port field and/or the destination port field. The packet header is attached to a datagram 140 to form a packet of the prescribed protocol, e.g., TCP/IP.

FIG. 2 illustrates the formation of aggregates in accordance with the method of the present invention. An aggregate is a set of flows that have at least one link or node in common in their path from source to destination and having a common property among all packets belonging to the flows. Router 200 represents a common node in the path of traffic sources 204, 206, 232, 234, 236, 237, and 238, and traffic sinks 202, 208, and 210. If all traffic at router 200 from sources 232, 234, 236, 237, and 238 are directed to a single destination, e.g., a web server on the Internet, an aggregate 240 may be formed from the flows from those sources. The common property of the flows defining the aggregate 240 is the common destination of the packets within the flows. A second aggregate 220 may be formed of the flows of all TELNET traffic between nodes 202, 204, 206, 208, and 210. In this case, the flows of aggregate 220 have an application in common, i.e., TELNET.

A key characteristic of TCP traffic is its responsiveness to packet drops. As is well-known, TCP implements a sliding window protocol to control the number of unacknowledged packets within the network. The degree to which a TCP aggregate reduces its rate in response to packet drops depends on packet size, round trip time, and the distribution of window sizes among the constituent flows. An aggregate may also include non-cooperative or malicious flows that do not participate in the TCP congestion control algorithm. Such flows are called non-comformant. The method of the present invention quantifies the responsiveness of an aggregate of packet flows to packet drops and can thereby estimate the fraction of traffic that is non-conformant. The method may then be used for a congestion control scheme, such as random early drop (RED). With quantitative information about the responsiveness of packetized traffic under a transmission control protocol, a switching device, such as a router, can better estimate the number of packets to drop so as to maintain a rate of traffic within the capacity of its outgoing links when the router is close to congestion.

The present invention will now be described by way of an exemplary embodiment of a network operating under TCP. It can be assumed that an aggregate is composed of TCP flows that conform to the TCP-Reno congestion control algorithm. Further, it is assumed that the window size of each TCP flow is a stationary random process, W(t).

TCP-Reno implements two different operational phases known as slow start and congestion avoidance. The slow start phase begins after a connection is made and increases the size of the sliding window by one, upon successful transmission of every packet and receiving acknowledgement thereof. The congestion avoidance phase begins after the window size exceeds a threshold value, whereupon the sliding window size is increased by one at every interval of the packet's round trip time. If a packet drop is detected, the window size is decreased by half its current value.

Let $\lambda(t)$ be the instantaneous arrival rate of a TCP aggregate. If D packets are dropped from the aggregate instantaneously at time t=0, and if D is small compared to the number of flows in the aggregate, then the aggregate will experience the following average instantaneous decrease in its rate:

$$E[\Delta\lambda(t_1)] = -\frac{BD}{2R}\frac{E[W^2]}{E[W]} \quad (1)$$

where $t_1 > 0$ is the time at which the aggregate experiences its minimum rate as a result of packet drops, and $\Delta\lambda(t)=\lambda(t)-\lambda(0^-)$ for any t>0.

This can be shown by assuming that at time t, the number of active flows in the aggregate is N(t). Furthermore, let $p_j(t)$ denote the unconditional probability that the window size of a flow at time t is equal to j. Then, the following holds for the total instantaneous rate of the aggregate:

$$\lambda(t) = \sum_{k=1}^{N(t)} \lambda_k(t) \qquad (2)$$

where $\lambda_k(t)$ is the incoming arrival rate of traffic of the $k^{th}$ flow belonging to the aggregate at time t. Since it was assumed D<<N(t), the probability of receiving multiple drops by the same flow is small, and thus it can be concluded that D flows experience packet drops. These flows shall be identified as $\{f_1, f_2, \ldots f_D\}$. Assume for a flow $f_1$, the window size at time t is $W_{f1}(t)$, the instantaneous rate is $\lambda_{f1}(t)$ and the decrease in the instantaneous rate as a result of dropping one packet is $\Delta\lambda.f_1(t)$. Since the overall instantaneous decrease in the rate of the aggregate is sum of the rate decreases for the flows that experienced drops:

$$E[\Delta\lambda(t)] = \sum_{i=1}^{D} E[\Delta\lambda_{fi}(t)]. \qquad (3)$$

From symmetry with respect to $\{f_1, f_2, \ldots, f_D\}$ it can be concluded that the D random variables $\{\Delta\lambda_{f1}(t), \Delta\lambda_{f2}, \ldots, \Delta\lambda_{fD}(t)\}$ are identically distributed and hence:

$$E[\Delta\lambda(t)] = \sum_{i=1}^{D} E[\Delta\lambda_{fi}(t)] = DE[\Delta\lambda_{f1}(t)] \qquad (4)$$

$E[\Delta\lambda_{f1}(t)]$ can be written as:

$$E[\Delta\lambda_{f1}(t)] = \sum_{j=1}^{\infty} E[\Delta\lambda_{f1}(t) | W_{f1}(0) = j] P(W_{f1}(0) = j \qquad (5)$$

Under the TCP-Reno protocol, a TCP flow in the congestion avoidance phase does not revert to slow start upon detection of a single packet drop, but continues in congestion avoidance phase and halves its window size. The reduction in window size may also occur when a sender receives a duplicate ACK. Thus, rate reduction at the sender occurs at a time that is a fraction of round trip time R and the router that transmitted a packet that was dropped observes the rate decrease for flow $f_1$ at time $t_1$, which is theoretically around the round trip time R. Since, in the congestion avoidance phase, the window size of a TCP flow cannot grow more than one per round trip time, it can be observed that $W_{f1}(t_1^-) \leq W_{f1}(0)+1$, or $W_{f1}(t_1^-) \approx W_{f1}(0)$. As a result of halving the window size, $W_{f1}(t_1) \approx W_{f1}(0)/2$ and, $$E[\Delta\lambda_{f1}(t_1) | W_{f1}(0) = j] = -\frac{Bj}{2R} \qquad (6)$$

It should be noted that since the round trip times of all flows are assumed to be the same, the time at which the aggregate experiences its minimum rate as a result of drops at t=0 is $t_1$, approximately the same time at which the $f_1, f_2, \ldots, f_D$ experience their minimum rate. After $t_1$ the flows begin to recover their optimal rates.

The other factor in (5) can be written:

$$P(W_{f1}(0) = j) = \frac{jp_j(0)}{\sum_{i=1}^{\infty} ip_i(0)} \qquad (7)$$

The numerator of (7) is proportional to the number of packets generated by the flows with window size j in some time interval around t=0, while the denominator is proportional to the number of packets generated by all flows in the same time interval. Thus, given a packet drop, the probability that the dropped packet belongs to a flow of window size j is given by (7).

Substituting (7) and (6) in (5) gives:

$$E[\Delta\lambda_{f1}(t_1)] = -\frac{B}{2R} \frac{\sum_{j=1}^{\infty} j^2 p_j(0)}{\sum_{i=1}^{\infty} ip_i(0)} = -\frac{B}{2R} \frac{E[W^2]}{E[W]} \qquad (8)$$

In the discussions above, we have made use of stationary assumption of the window size, and so the expected values in the middle term of (8) are independent of time. This is true as long as the flows belonging to the aggregate are in their respective congestion avoidance state.

It is straightforward to use similar logic to extend the above result to the case in which the flows forming the aggregate do not have the same round trip times. In such instance, the rate reduction of different flows that experienced packet drops does not occur at the same time, and the rates are reduced in smaller increments spread over time. The expected value of the sum of these smaller rate decreases is:

$$-\frac{BD}{2} \frac{E[W/R^2]}{E[W/R]} \qquad (9)$$

in which R is the random variable describing the round trip time of a packet belonging to a flow in the aggregate.

From equation (1), the following useful observations may be made (1):

Remark 1: The amount of rate decrease as a result of dropping D packets from the aggregate is independent of the absolute instantaneous rate of aggregate $\lambda(t)$, and the number of flows contributing to the aggregate, N(t).

Remark 2: The rate decrease exhibits linear behavior as a function of the number of dropped packets, D. In later paragraphs, it will be shown that this linearity may be used to define a simple estimator of the portion of the aggregate which is not responsive to packet drops or congestion control. It is important to notice that this linearity is valid only if D<<N(t).

Since equation (1) gives only the instantaneous rate decrease, it is useful to study how the aggregate responds over time after packet drops. For this purpose, and under the same assumptions of the previous analysis, we can state that if D packets from a TCP-Reno flow aggregate are dropped at time t=0, and D is small compared to the number of flows in the aggregate, then the average decrease in the rate of aggregate at time t>0 is:

$$E[\Delta\lambda(t)] = -\frac{BD}{R}\theta(F_W, t) \quad (10)$$

where $F_W$ is the probability density function of window size $W(t)$ and $\theta(\ldots)$ is a nonnegative known function. This is shown by, following the logic used to obtain equation (6). It should be observed that for a flow $f_1$ that has received a drop at time $t=0$:

$$E[\Delta\lambda_{f1}(t) | W_{f1}(0) = j] = \frac{B}{R} E[W_{f1}(t) - W_{f1}(0) | W_{f1}(0) = j] \quad (11)$$

However, $E[W_{f1}(t)|W_{f1}(0)=j]$ describes how the window size of a flow is increased after receiving a single packet drop at time $t=0$ from a given initial condition $W_{f1}(0)=j$, and is independent of $B$, $D$ and $R$. The statement of Equation (10) is provided by substituting (11) and (7) in (5). It can be seen that $\theta(F_W, t)$ can be written in the following way:

$$\theta(F_W, t) = \frac{\sum_{j=1}^{\infty} j p_j(0)(j - E[W_{f1}(t) | W_{f1}(0) = j])}{\sum_{i=1}^{\infty} i p_i(0)} \quad (12)$$

It is generally difficult to find a closed form for $\theta(F_W,t)$ for an arbitrary time $t$. However, the comments given in Remark 1 and Remark 2 remain true, and can be used to develop an estimator of the TCP Conforming Component of an Aggregate.

In the present exemplary embodiment, a TCP flow is said to be conformant if it responds to packet drops in the manner prescribed by the congestion control algorithm of TCP-Reno. The preceding analysis predicts a response of an aggregate consisting entirely of conformant TCP flows to a perturbation consisting of a small number of packet drops. Attention will now be given as to how the results obtained above can be used to estimate the proportion of conformant traffic in an arbitrary aggregate of TCP flows.

Equation (1) presents a basis for an algorithm for testing the responsiveness of an aggregate to packet drops. At time $t=0$, some randomly selected packets are dropped from the aggregate. Based on the comparison of the observed decrease in the transmission rate of the aggregate to the expected decrease, the non-conforming component of the traffic can be estimated. Whereas, the values of $E[W^2]$ and $E[W]$ are not known in advance by the algorithm, traffic during the normal conditions when all traffic is assumed conformant is observed to estimate the ratio $E[W^2]/E[W]$.

Equation (1) assumes that a router observes all responses to packet drops simultaneously, but there may be some mismatch in the time that different flows respond thereto. This problem is compounded when the round trip times of different flows are not the same. In such a case, the responses of each of the individual flows that have undergone packet drops may be spread out in time, and (10) provides an estimate of the sum of these smaller rate decreases.

Figure 3:
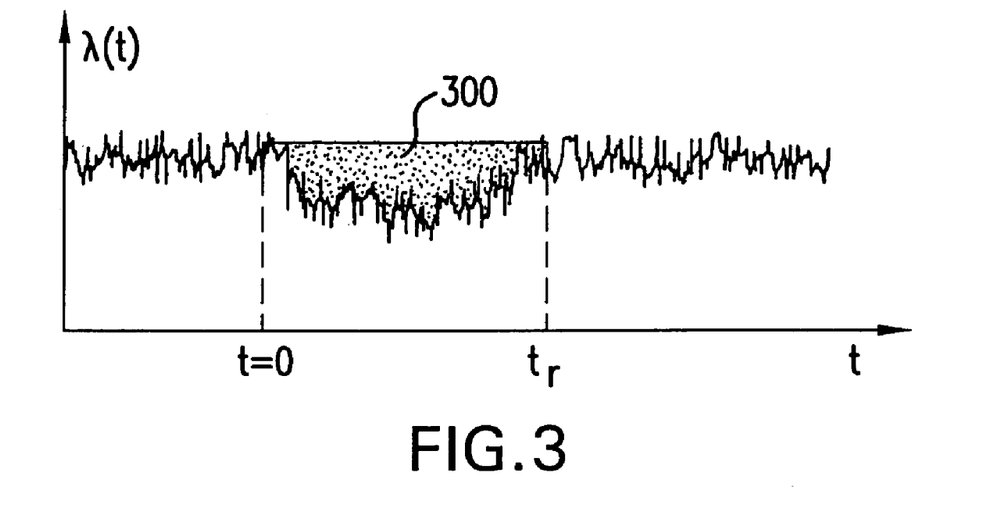
FIG. 3 is a graph representative of a response in traffic to dropped packets.

To overcome this deficiency, another metric is defined to quantify the degradation of the aggregate as a result of packet drops. This metric is defined as:

$$\eta(D) = \int_0^{t_r}(\lambda(0^-) - \lambda(t))dt \quad (14)$$

where $t_r$ is a nonnegative finite time, and it can be chosen to be the minimum time for the recovery of all flows that experienced packet drops, and $\lambda(0^-)$ is the instantaneous transmission rate at the moment before dropping the first packet. To achieve better results, $\lambda(0^-)$ may be replaced by a short-term average of the rate of aggregate in a time interval earlier than $t=0$. $\eta(D)$ is a measure of how many more packets could have been sent by the aggregate if not for the D packets being dropped and is illustrated as the shaded region 300 in the graph of FIG. 3. Based on equation (10):

$$E[\eta(D)] = \frac{BD}{R}\bar{\theta}(F_W) \quad (15)$$

in which $$\bar{\theta}(F_W) = \int_0^{t_r} \theta(F_W, t)dt \quad (16)$$

As previously stated, in practice, it is difficult to find closed form expressions for $\bar{\theta}(F_W)$, however either $E[W^2]/E[W]$ or $\bar{\theta}(F_W)$ may be estimated during the normal operating conditions of the network. Fortunately, $E[\eta(D)]$ is still independent of the number of flows in the aggregate $N(t)$ and the absolute rate of traffic $\lambda(t)$. Additionally, $\eta(D)$ is a linear function of $D$. These properties of $\eta(D)$ assist in defining a simple and scalable tool to estimate the fraction of traffic within an aggregate that is responsive to packet drops.

In certain embodiments of the present invention, $t_r$ is a parameter of the estimator, and it is not necessarily the minimum time for the recovery from packet drops by all flows. A smaller or larger value of $t_r$ still preserves linear dependence of $E[\eta(D)]$ on $D$. However, a shorter value may result in discarding some useful information and a longer value results in the addition of noise and, thereby, to the variance of the observation of $\eta(D)$.

To derive the estimator of the non-responsive component of an aggregate, the TCP-conforming component of the traffic aggregate is assumed to send its traffic at unknown rate $\lambda_T(t)$. Likewise, the non-TCP-conforming component sends its traffic with rate $\lambda_N(t)$. Obviously, the total rate $\lambda(t)=\lambda_T(t)+\lambda_N(t)$ and $\lambda(t)$ is completely observable. To estimate $\lambda_T(t)$ and $\lambda_N(t)$, D packets are randomly dropped from the aggregate at time $t=0$. The conforming component undergoes $D_T(t)$ packet drops. The expected value of $D_T(t)$ is:

$$E[D_T(t)] = \frac{\lambda_T(t)}{\lambda_N(t) + \lambda_T(t)} D = \rho D \quad (17)$$

in which $$\rho = \frac{\lambda_T(t)}{\lambda_N(t) + \lambda_T(t)}$$

is the fraction of aggregate that is TCP conforming. Since the nonconforming portion does not respond to packet drops, the rate decrease of the entire aggregate is equal to the rate decrease of the TCP-conforming component of that aggregate, which, by using equation (15), can be written as:

$$E[\eta(D)] = \rho \frac{BD}{R} \theta(F_W) \quad (18)$$

We use equation (18) to construct an estimator for the ratio of the aggregate traffic that is conformant. Let $\bar{\rho}$ denote the estimate of this ratio. Note, in (18), $\eta(D)$ is fully observable and can be measured by using (14) after dropping D packets. Using (18), we will define the following estimator for the value of $\rho$:

$$\bar{\rho} = \frac{R}{DB} \frac{1}{\theta(F_W)} \eta(D) \quad (19)$$

It should be noted that in (19), the value of $$\frac{R}{B\theta(F_W)}$$

is constant and independent of D and can be estimated during the normal conditions of the network when the aggregate is fully conformant to TCP congestion control ($\rho=1$). This quantity can be used later to estimate $\rho$. To decrease the variance of the estimator, multiple tests may be performed to achieve a more accurate estimate of $\rho$. We call this estimation method Aggregate Perturbation Method or APM.

Figure 4:
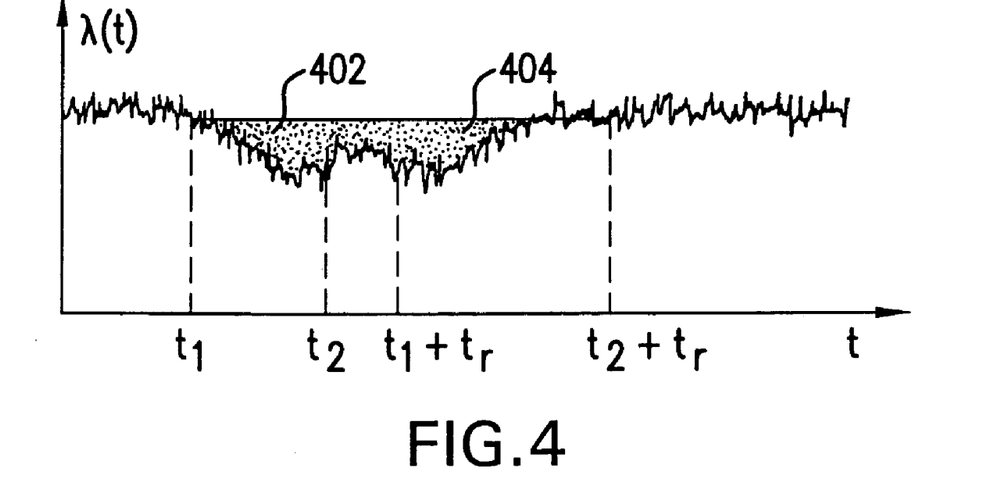
FIG. 4 is a graph illustrating the interference encountered when multiple perturbation tests of the present invention are performed simultaneously at different switching nodes.

One aspect of the present invention overcomes problems of distributed implementations of the aggregate perturbation method described above. Without special consideration, APM has the potential of perturbing an aggregate simultaneously from two different test points. That is to say, the measurements of a perturbing router on an aggregate can be compounded by a simultaneous perturbation done on the same aggregate in a downstream or upstream router. This phenomenon is illustrated in FIG. 4. As is illustrated in the Figure, the response of an APM test of a router at $t=t_1$, indicated by the shaded region at 402, is overlapped by the response of the aggregate to another router's test at time $t=t_2$, shown at 404. This interference occurs when $t_1$ and $t_2$ are close to each other (more precisely, $|t_2-t_1|<t_r$). Thus, applying Equation (1) to the measurement does not provide accurate information about the responsiveness of the aggregate and the interference adversely affects the results of both tests.

To avoid the problems associated with overlapping periods of perturbation by multiple routers, a unique temporal pattern is assigned to each router such that at any point in time, the instantaneous packet drop rates behave in accordance with the particular drop signature of the router. The proper assignment of the temporal perturbing patterns and a proper definition of the aggregate degradation measure for each perturbing router results in a test and measurement of each router that will be robust to the interference caused by other simultaneous perturbing routers. As will be shown in paragraphs that follow, perturbing patterns which are orthogonal to one another, similar to the modulation of a code division multiple access (CDMA) communication method, results in the desired behavior. For this reason, the aggregate perturbation method having applied thereto a set of orthogonal perturbation patterns is referred to as CDMA-based APM or CAPM.

CAPM differs from APM in two ways. The first difference is that the packet drops are spread over time. In other words, instead of dropping D packets from the aggregate instantaneously at time $t=0$, the packet drops are spread over a time interval [0, T]. In this scheme, perturbation is done according to the packet drop rate function $r_i(t):[0, T] \to R$ for the $i^{th}$ router. The responsiveness test and measurement is done during the interval [0, T], and at time $t \leq T$, the $i^{th}$ router drops $r_i(t)$ packets per second from the aggregate. We refer to $r_i(t)$ function as the drop signature of the $i^{th}$ router.

The second difference between CAPM and APM is the way in which the degradation measure for the $i^{th}$ router is defined as the response to dropping with rate i(t). In this case, instead of the simple integral given by equation (14), a weighted integral is used to quantify the responsiveness of the aggregate under perturbation:

$$\eta_h(r_i) = \int_0^T h(t) \Delta \lambda(t) dt \quad (20)$$

in which $\Delta \lambda(t) = \lambda(0^-) - \lambda(t)$, and h(t) is a weighting function that sets the relative importance of different time periods in the degradation value.

To mitigate the interference problems of multiple simultaneous perturbing routers, each router perturbs the traffic according to its unique drop signature based on a CDMA-type code assigned to it. If the drop signature of individual routers is selected so they are orthogonal to each other in a certain sense, then by proper definition of the weighting function h(t), the measure of degradation in a router defined in equation (20) will be independent of the perturbations done by the other routers.

Similar to the CDMA systems, the drop signature of the $i^{th}$ perturbing router is defined by:

$$r_i(t) = A_i \sum_{j=1}^{N} c_j p_{T_c}(t - (j-1)T_c) = A_i s_i(t) \quad (21)$$

in which $A_i$ is a known perturbation amplitude of the $i^{th}$ router, N is a positive integer called the spreading factor, $T_c=T/N$, and $(c_1, c_2, \ldots, c_N)$ is a binary sequence assigned to the particular router known as the code of the router. In (21), $s_i(t)$ denotes the normalized drop signature and $P_{T_c}(t)$ is a real-valued function known as the chip waveform which satisfies the following property:

$$\int_{-\infty}^{\infty} p_{T_c}(t) p_{T_c}(t - nT_c) dt = 0, \; n = 1, 2 \quad (22)$$

The measurement at the $i^{th}$ router as to the responsiveness of the aggregate is made based on the Matched Filter output. The matched filter output is the value of $\eta_h(r_i)$ evaluated at $h(t) = s_i(t)$:

$$y_i = \int_0^T s_i(t) \Delta \lambda(t) dt \quad (23)$$

Since $r_i(t)$ is a drop rate and should therefore be nonnegative, $p_{T_c}(t)$ should be nonnegative. In one embodiment of the present invention, the popular simple rectangular chip waveform is used, i.e., $$p_{T_c}(t) = \begin{cases} 1, & 0 < t < T_c \\ 0, & \text{otherwise} \end{cases} \quad (24)$$

In the CDMA systems, assignment of the codes is very important. Users with a potential of high interference (e.g., adjacent routers in the exemplary Internet embodiment) are assigned codes that cause their drop signatures to be orthogonal (or close to orthogonal)

$$\int_0^T s_i(t) s_j(t) dt = 0, \text{ for } i \neq j \quad (25)$$

Unfortunately, the statement of (25) cannot be satisfied with the current definition of drop signatures defined in (21). That is because both $s_i(t)$ and $s_j(t)$ are nonnegative rate functions, and hence the integral defined in (7) can never be zero. This problem is overcome by making a minor change in the orthogonality requirement and the structure of the matched filter. First, the orthogonality condition is replaced by a similar condition in which the normalized drop signatures are orthogonal after removing their DC components:

$$\int_0^T s_i^a(t) s_j^a(t) dt = 0, \text{ for } i \neq j \quad (26)$$

in which $x^a(t)$ is $x(t)$ after eliminating its DC component over $[0, T]$:

$$x^a(t) = x(t) - \frac{1}{T} \int_0^T x(t) dt \quad (27)$$

Accordingly, the matched filter output for the $i^{th}$ router is modified in the following way:

$$y_i = \eta_{s_i^a}(r) = \int_0^T s_i^a(t) \Delta \lambda(t) dt \quad (28)$$

where $y_i$ is the value of $\eta_h$ in (20) evaluated for $h(t) = s_i^a(t)$. It is important to note that r in equation (28) is the total perturbing function, since the rate decrease $\lambda(0^-) - \lambda(t)$ is affected by this total drop rate (i.e., $r(t) = \Sigma_k r_k(t)$, where k is an index that covers the set of all router perturbations experienced by the aggregate). It can be shown that if the total drop rate $r(t)$ is small enough compared to the rate of aggregate, then the system with input $r(t)$ and output the expected value of rate degradation $E[\Delta\lambda(t)]$ can be approximated by a linear system. In other words, the system can be linearized around its operating point.

Assuming an overall drop rate $r(t) = \Sigma_k r_k(t)$ small enough such that the system with input $r(t)$ and output $E[\Delta\lambda(t)]$ can be approximated by a linear system and the holding time of the piecewise constant functions $r_k(t)$ on each constant interval is large enough compared to the response time of the aggregate, then under the orthogonality assumption of (26), we have:

$$E[y_i] = E[\eta_{s_i^a}(r)] = E[\eta_{s_i^a}(r_i)] \quad (29)$$

Note that the middle term of equation (29) is the measure of degradation with the weight function $h(t) = s_i^a(t)$ when all routers perturb the aggregate, however, the right term is the measure of degradation with the same weight function when only the $i^{th}$ router perturbs the aggregate. The significance of (29) is that under the orthogonality condition of equation (26) the expected degradation measure at router i, $E[\eta_{s_i^a}(r)]$, is independent of perturbations being done at the other routers.

In the previous discussions, it was assumed that the holding time of $r_k(t)$ on the intervals on which it is constant is large enough compared to the aggregate response time. Generally, the response time of an aggregate is characterized by the round trip time of the flows contributing thereto. Thus, for the piecewise constant function $r_k(t)$, the length of each constant interval should be significantly larger than the typical round trip time of the flows in the aggregate. This condition can be satisfied by making $T_c$ long enough (e.g., 10 to 20 times the typical round trip time).

One useful observation about (28) is:

$$\int_0^T s_i^a(t) \lambda(0^-) dt = 0 \quad (30)$$

which provides the following simple equation for the output of the matched filter for the $i^{th}$ router:

$$y_i = -\int_0^T s_i^a(t) \lambda(t) dt \quad (31)$$

From (20) and (29), the following expression for the average output of the matched filter of the $i^{th}$ perturbing router is valid:

$$E[y_i] = E[\eta_{s_i^a}(r_i)]$$

This equation gives the basis for quantifying the responsiveness of TCP aggregates. Denote:

$$K_i = y_i / A_i \quad (32)$$

Notice that $K_i$ is a coefficient that describes how much the aggregate is responsive to packet drops. We call this quantity the response coefficient of the aggregate. Note also that $y_i$ is fully observable, and can easily be measured by using (31). The amplitude of perturbing function $A_i$ is known to the router that executes the perturbation. To detect and estimate the non-conforming traffic, $K_i$ is compared with $\overline{K}_i$, the response coefficient when the aggregate is "clean", i.e., free from non-conforming traffic and congestion. In one embodiment of the present invention, $\overline{K}_i$ is determined by CAPM during periods when the network is known to be clean. In another embodiment, $\overline{K}_i$ is estimated from a long-term average over multiple tests of $y_i/A_i$. From (29), it should be observed that the values of $K_i$ and $\overline{K}_i$ are not affected by the perturbations executed by the other routers due to orthogonality conditions.

As previously stated, $T_c$ should be chosen such that the rate decrease of the aggregate as a result of packet drops in one chip duration can be observed. On the other hand, $T_c$ chosen too large does not improve the performance in estimating the response coefficients, and only causes longer test periods and more packet drops, which causes the test to be more expensive.

In one embodiment of the present invention, the method uses CAPM to provide a fair congestion control protocol. Random Early Drop (RED) is a popular approach to proactively prevent congestion in a router. By utilizing CAPM, a router collects information about how responsive are different aggregates, via the $K_i$ coefficients defined above. The knowledge of these coefficients assists a router to determine how much total traffic it should drop from each aggregate to reduce its bandwidth to a certain value so as to avoid congestion.

Assume a traffic composed of many aggregates is intended to be forwarded through an outgoing link that is experiencing a bandwidth shortage. Obviously, it is desired to maintain the traffic bandwidth within the outgoing link capacity. If the router applies equal drop probability governed by a congestion control algorithm such as RED to all aggregates, the aggregates with higher response coefficients will back off more aggressively compared to the aggregates with smaller response coefficients. A certain degree of fairness among aggregates can be achieved by taking into account their response coefficients. For example, if the traffic is a combination of M aggregates, and $\lambda_i(t)$ and $K_i$ denote the estimated instantaneous arrival rate and the response coefficient of the $i^{th}$ aggregate, respectively then to limit the total traffic rate, the output of the congestion control mechanism at time t can be set to p(t). Subsequently, the information of the response coefficients for each aggregate can provide an estimate as to how this total drop probability should be assigned among all aggregates to achieve a specific rate decrease for each individual aggregate.

To illustrate the above approach, assume it is desired to have the same amount of rate decrease for all aggregates. Packet drops among different aggregates can be assigned in a way that the product of the response coefficient and the drop rate is equal for all of them. In other words:

$$K_i\theta_i(t)=K_j\theta_j(t) 1 \leq i, j \leq M \quad (33)$$

in which $\theta_i(t)$ and $\theta_j(t)$ denote the average drop rate of the $i^{th}$ and $j^{th}$ aggregate, respectively, at the same router. It should be observed that equation (33) implies that the rate decrease of the individual aggregates should be equal. Also important to note is that equation (32) suggests using (33) as a heuristic value to equalize the rate decreases of the aggregates (however, (33) is not a mathematical consequence of (32)).

If $p_i(t)$ is the drop probability of the $i^{th}$ aggregate, then $\theta_i(t)=\lambda_i(t)p_i(t)$ and equation (33) can be written as:

$$K_i\lambda_i(t)p_i(t)=K_j\lambda_j(t)p_j(t) \ 1 \leq i, j \leq M \quad (34)$$

which provides M−1 linear equations. To find the numerical values for the drop probabilities one other equation is required. As previously stated, the total drop probability of the traffic can be set to p(t) and:

$$\sum_{i=1}^{M} \frac{p_i(t)\lambda_i(t)}{\lambda(t)} = p(t) \quad (35)$$

in which $\lambda(t)=\lambda_1(t)+\lambda_2(t)+\ldots+\lambda_m(t)$ is the total rate of traffic. The derived fair congestion prevention scheme may then be applied.

Figure 5:
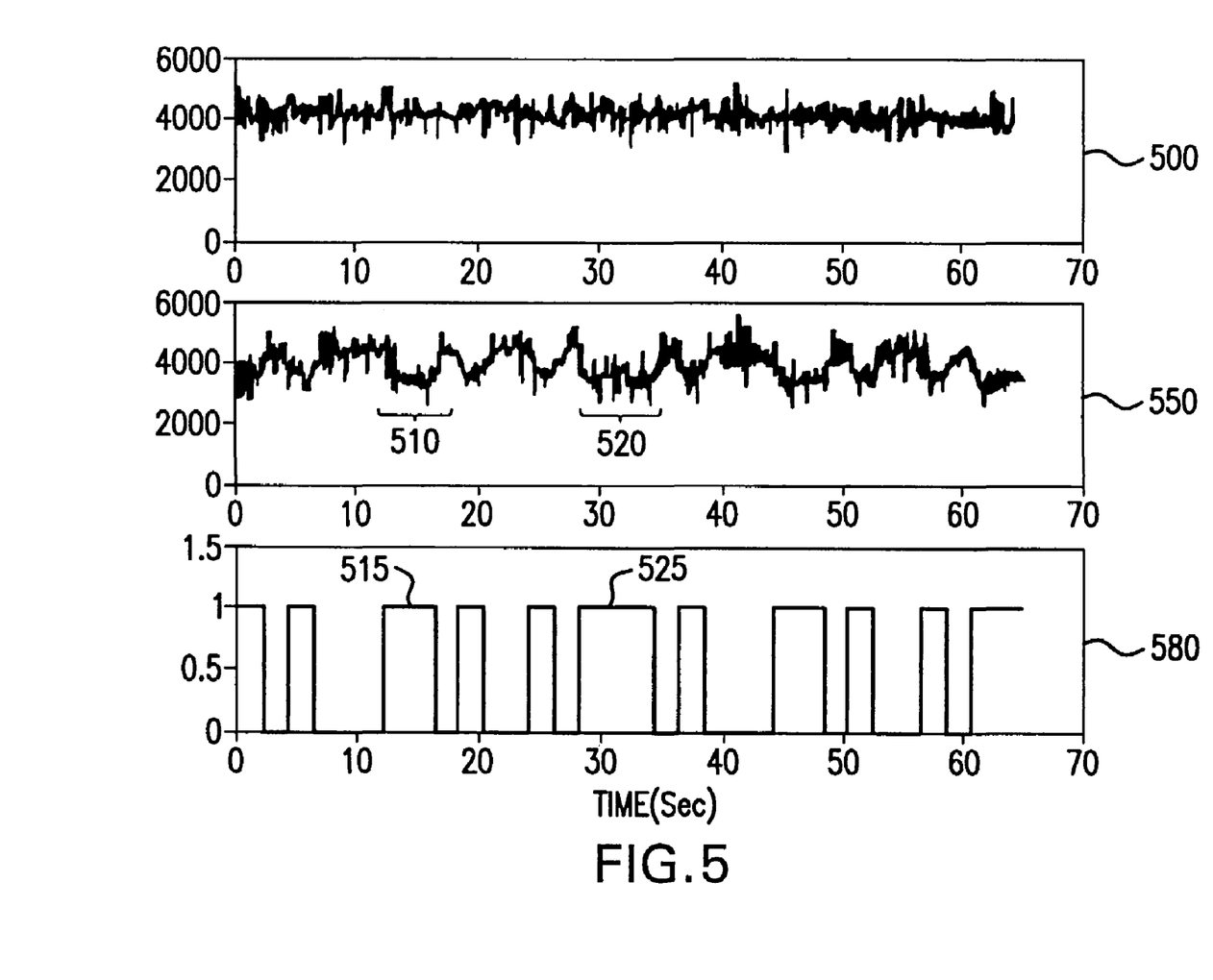
FIG. 5 is an illustration, by way of a group of graphs, illustrating the response in network traffic by a drop rate controlled by a particular drop rate signature of the present invention.

Referring to FIG. 5, there is shown a set of graphs illustrating an aggregate's response to a signature-based perturbation. The data flow shown in graph 500 illustrates the steady state flow of the aggregate. The data flow of graph 550 undergoes a packet drop rate in accordance with the drop rate signature illustrated in graph 580. A router perturbing the aggregate uses the drop rate $r_1(t)=A_1s(t)$, where s(t) is the normalized drop signature (1, 0, 1, 0, 0, 0, 1, 1, 0, 1, 0, 0, 1, 0, 1, 1) of equation (21) and $A_1$ is, in this example, set to 160 packet drops per second. As was expected, the data flow rate illustrated in graph 550 takes on a shape complementary to the drop rate signature of 580. This is especially prevalent in regions 510 and 520 corresponding to packet drop periods 515 and 525, respectively.

Figure 6:
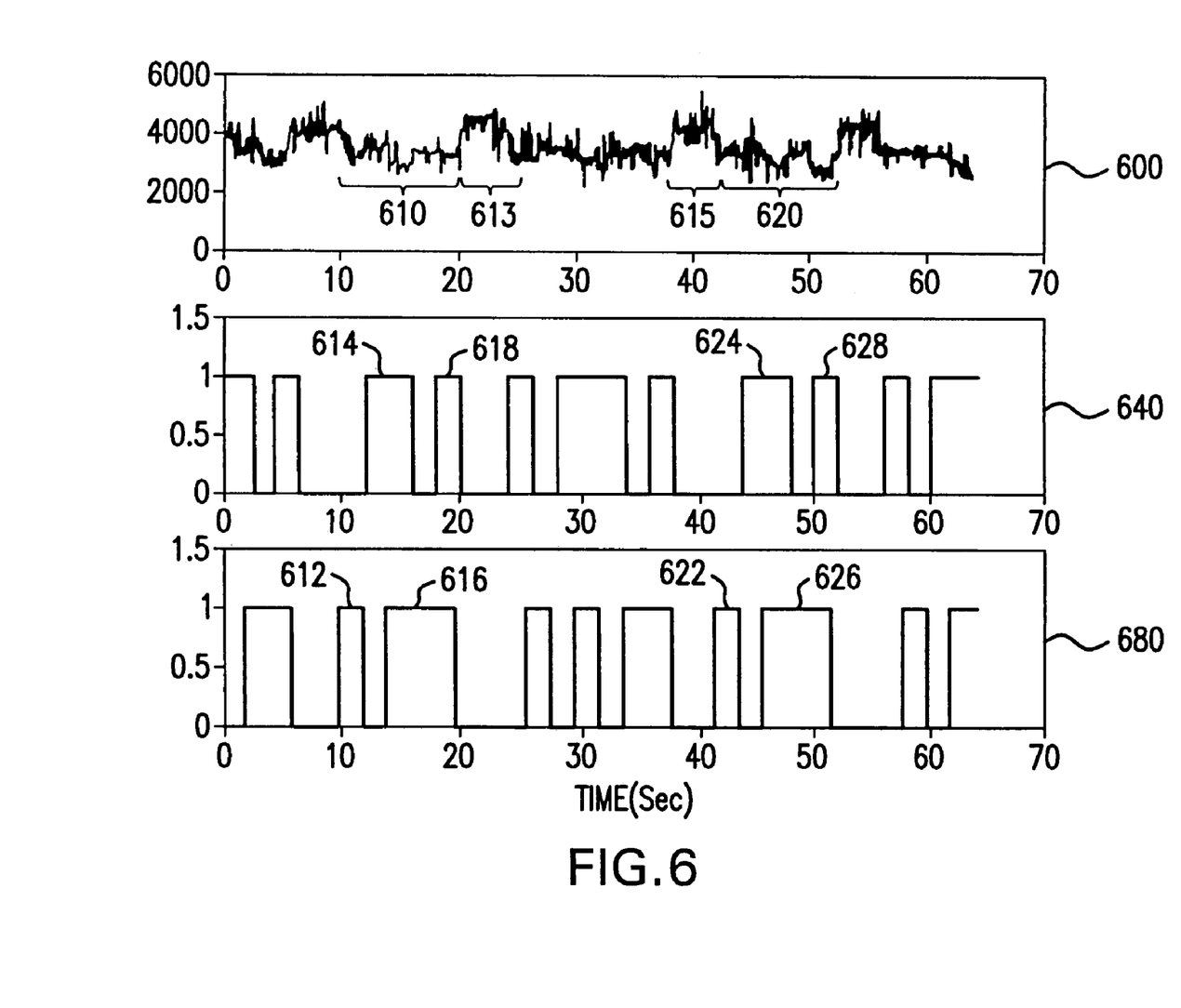
FIG. 6 is an illustration, by way of a group of graphs, depicting the effect on the aggregate traffic by multiple orthogonal drop rate signatures in accordance with the present invention.

In FIG. 6, a typical response is shown where two routers perturb an aggregate flow simultaneously. The drop rate code of router $R_1$, shown in graph 640, is (1, 0, 1, 0, 0, 0, 1, 1, 0, 1, 0, 0, 1, 0, 1, 1) and that for router $R_2$ is (0, 1, 1, 0, 0, 1, 0, 1, 1, 1, 0, 0, 0, 1, 0, 1), as shown in 680. The two drop signatures $s_1^a(t)$ and $S_2^a(t)$ as shown in 640 and 680, respectively, are orthogonal. The flow rate for the aggregate as influenced by the perturbation signals of the two routers is shown in graph 600. It should easily be observed that the additive shape of the two drop signatures appears on the aggregate rate waveform (with a 180° phase shift). Thus, the two drop signatures modulate the aggregate rate additively. For example, at regions 613 and 615, where the perturbation waveforms of both routers are zero, the aggregate transmission rate is approximately its nominal value, i.e., the flow rate of an unperturbed aggregate. On the other hand, in regions 610 and 620, the amplitude of both drop signatures is non-zero due to drop periods 612, 614, 616, and 618 for region 610 and drop periods 622, 624, 626, and 628 for region 620. However, since the two perturbation codes are orthogonal, the output of the matched filter of any one router will produce the appropriate rate thereat as discussed hereinabove.

Figure 7:
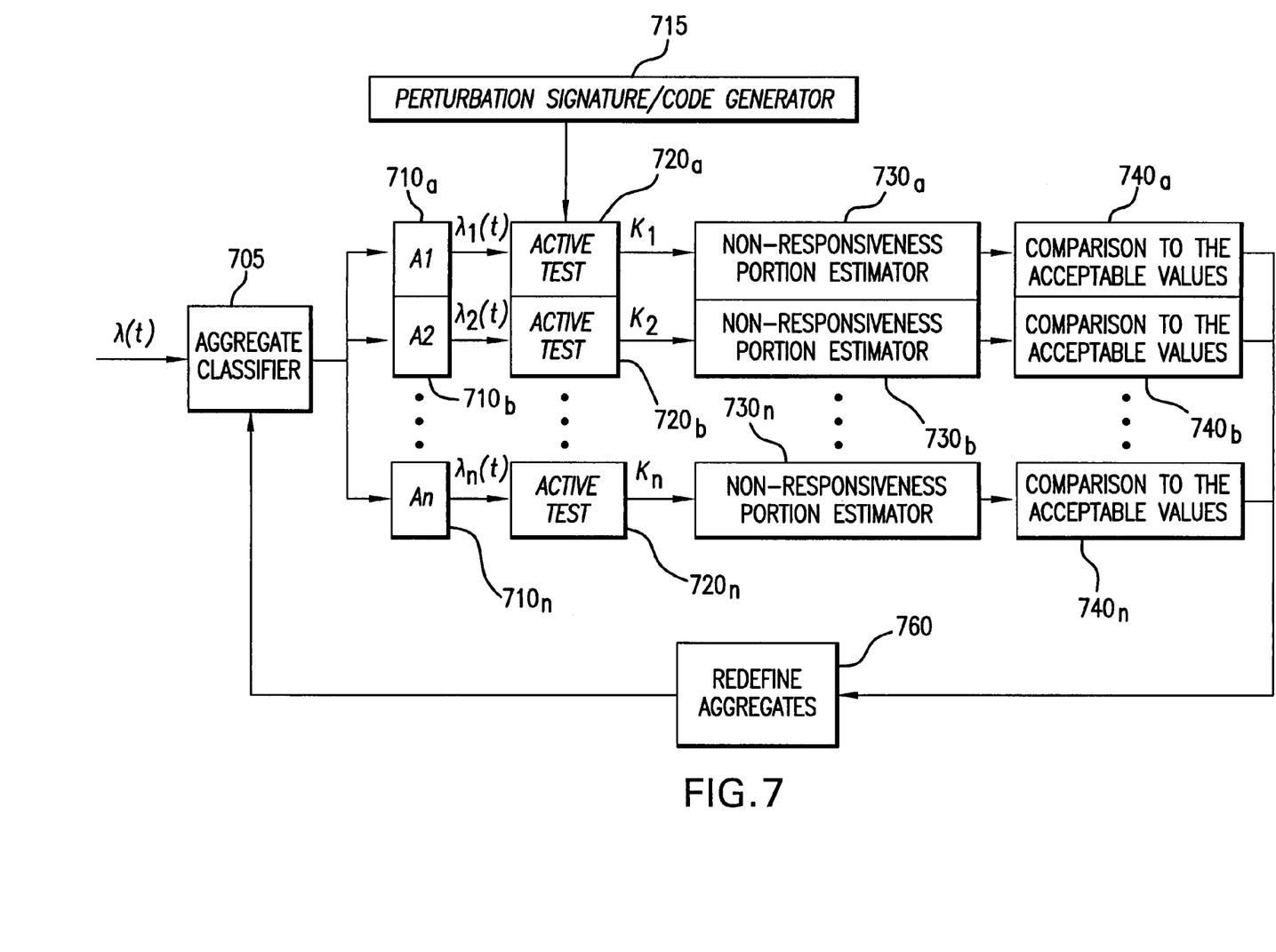
FIG. 7 is a block diagram illustrating key components of the method of the present invention.

Referring now to FIG. 7, there is shown a block diagram of a system for carrying out the method of the present invention. The method of the present invention can advantageously be implemented without a change in hardware. Thus, the system of FIG. 7 may be implemented via a change in the control code of individual routers.

As is shown in the Figure, a plurality of flows $\lambda(t)$ is introduced to an aggregate classifier 705 which forms a plurality of aggregates in accordance with some common features in the individual flows. The aggregates $710_a$-$710_n$ each have an aggregate flow rate $\lambda_1(t), \ldots, \lambda_n(t)$, respectively. The aggregate flows are presented to the active test, i.e., packets are dropped in accordance with an instantaneous drop rate of the router's assigned orthogonal code produced by code generator 715. The active test produces a set of response coefficients $K_1$-$K_n$ which are introduced to a corresponding non-responsiveness portion estimator $730_a$-$730_n$. The non-responsive portions are compared with acceptable values in blocks $740_a$-$740_n$.

In the embodiment of the present invention illustrated in FIG. 7, the choice of aggregates is dynamic and the aggregates may be redefined, as shown in 760, at any point during the testing period. The redefined aggregates are introduced to the aggregate classifier in 705 and the process is repeated.

Figure 8:
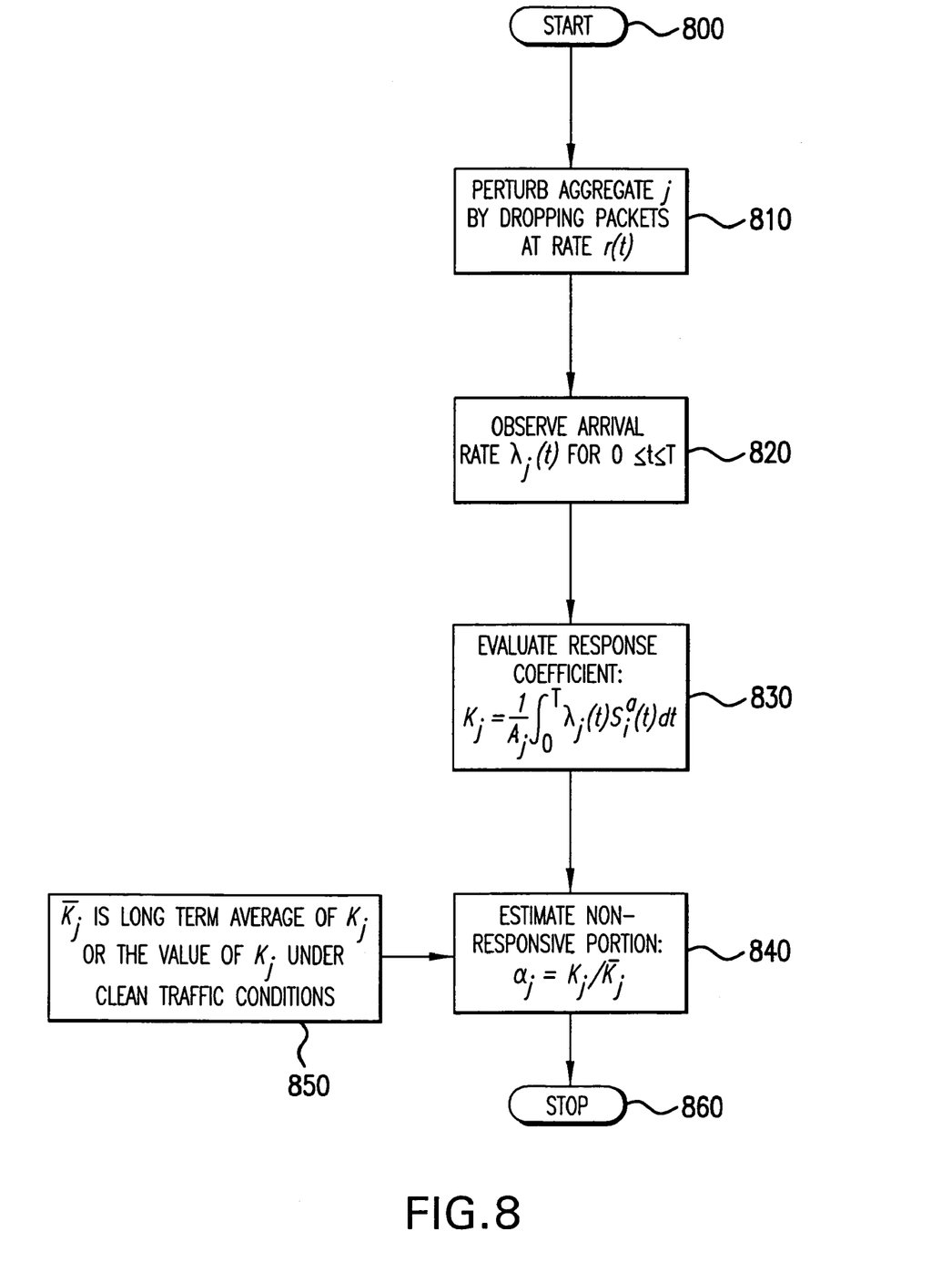
FIG. 8 is a flow chart depicting the pertinent steps of the perturbation method of the present invention.

FIG. 8 is a flow diagram depicting the pertinent steps of an exemplary embodiment of the present invention. The method is entered at start block 800 where control is transferred to block 810 in which aggregate j is perturbed by dropping packets at a rate $r_i(t)$. The drop rate $r_i(t)=A_is_i(t)$, where $A_i$ is the amplitude of the perturbation signal and $s_i$ is the drop signature of the $i^{th}$ router. The arrival rate $\lambda_j(t)$ for the aggregate j is observed for the period $0 \leq t \leq T$ as shown at block 820. The response coefficient is then calculated per block 830 and the non-responsive portion is estimated in block 840. Note that in block 830, $s_i^a(t)$ is the AC component of $s_i(t)$. As shown in block 850, the value $\overline{K_j}$ is supplied to block 830 as either a long term average of $K_j$ or is the value of $K_j$ under clean traffic conditions, i.e., all traffic flow is conforming to the transmission control protocol. The estimate of the non-responsive portion may then be used in a variety of applications, such as congestion control and mitigating a denial-of-service attack. The method is exited at stop block 860.

Figure 9:
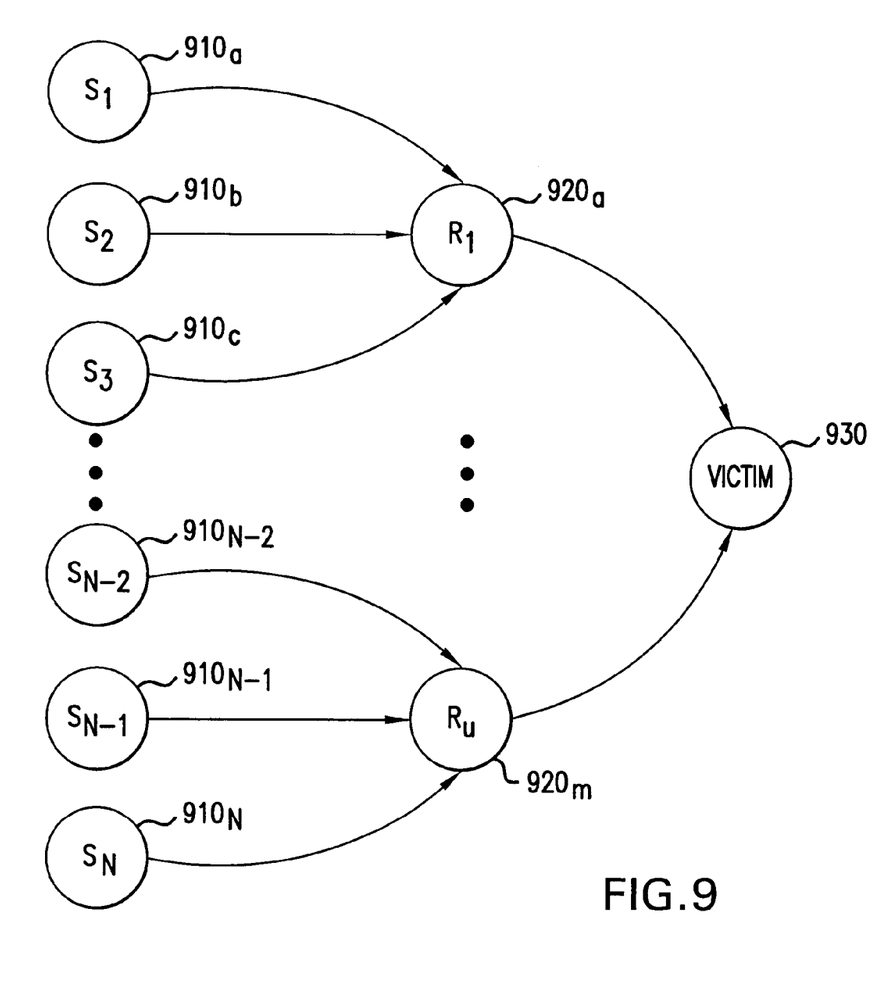
FIG. 9 is a diagram illustrating a distributed denial of service attack.

In an exemplary embodiment of the present invention, the indication of the portion of non-conforming traffic can be used to minimize the effects of a distributed denial-of-service (DDoS) attack, a diagram for which is illustrated in FIG. 9. The DDoS defense policy is rooted in the fact that the traffic sent by the DDoS sources over the Internet is TCP non-conforming.

As shown in the Figure, the DDoS target is a victim 930 and suspect traffic is forwarded thereto via routers $920_a$-$920_m$. The traffic is generated at sources $S_1$-$S_N$, shown at $910_a$-$910_N$. The traffic traverses the routers $920_a$-$920_m$ where APM or CAPM is implemented. A unique property of the defense policy based on APM or CAPM is that the intermediate routers do not use any downstream feedback, statistical or otherwise, in order to determine the special characteristics or attack signature of the malicious traffic. Thus, a proactive defense to protect the victim is established before it is significantly impacted by the attack.

The DDoS defense is based on dividing the traffic at the intermediate router nodes $920_a$-$920_m$ into the flow aggregates described above. The intermediate routers $920_a$-$920_m$ need only examine the aggregates rather than the many individual flows. Each aggregate is tested by dropping a small number of packets and observing the response of that aggregate to the packet drops. Based on these observations, the routers can estimate the ratio of attack traffic to the total traffic. To achieve more accurate results, each intermediate router $920_a$-$920_m$ may perform multiple tests on each aggregate. A final step toward protecting the victim is to install a filter to process the traffic being forwarded. This filter may be adaptively designed to have the most appropriate match to the signature or pattern of the attack traffic, i.e., passing the packets belonging to clean aggregates with the high probability and passing the packets belonging to the polluted aggregates with the low probability. It should be reiterated that an advantage of implementing APM or CAPM is that they are intended to be applied proactively to detect and mitigate a DDoS attack before a significant increase in congestion-induced packet dropping occurs near the victim.

Another response to a DDoS attack, as would be discovered by the method of the present invention, is through pushback. In pushback, the signature of the attack traffic is identified and advertised upstream for the filtering purpose. The detection of the attack signature in the conventional pushback is based on the congestion control mechanism and observing the pattern of dropped packets or other packets at the congested routers. Thus, the signature of attack is unknown before congestion happens as a result of DDoS. However, congestion indicates an advanced phase of DDoS. APM or CAPM can contribute to pushback by detecting the signature of attack in an earlier phase of a DDoS attack and before congestion occurs. The attack signature discovered via APM or CAPM indicates which aggregates are more likely to be polluted by the attack traffic. Therefore, by using APM or CAPM, pushback can act more effectively by being independent of congestion and starting in an earlier phase of the DDoS attack.

Flash crowds are among the phenomena which can cause heavy congestion in the Internet. In a flash crowd, a huge number of data packets are flooded toward a destination, say, for example, at the end of a popular Internet auction. The flash crowd may cause very heavy congestion in the links close to the destination or other places in the network like border gateways. In practice, it is very likely that most of the flows of a flash crowd belong to a few aggregates. The response coefficient of aggregates that carry more traffic belonging to the flash crowd experiences a greater decrease, so by filtering the packets belonging to these aggregates more aggressively and close to their sources, the other aggregates can be saved from congestion.

As previously stated, another application of APM and CAPM is congestion control through Random Early Drop (RED). However, tuning up the parameters of a RED congestion controller is a challenging problem. Initiating congestion preventative drops too early causes under-utilization of the resources and dropping packets too late does not allow RED to prevent congestion. However, by utilizing either APM or CAPM, a router collects information about how responsive different aggregates are, i.e., $K_i$ coefficients defined earlier. With knowledge of these coefficients, a router can determine how much it should drop from the aggregates to reduce its bandwidth to a certain value.

Although the invention has been described herein in conjunction with specific embodiments thereof, many alternatives, modifications, and variations will be apparent to those skilled in the art. The present invention is intended to embrace all such alternatives, modifications, and variations that fall within the spirit and broad scope of the appended claims.

What is claimed is:

1. A method for determining the responsiveness of a data transmission rate of data packets to packet drops in a distributed communication network, the communication network including a plurality of switching nodes having a set of the plurality of flows respectively traversing therethrough, the method comprising the steps of:

assigning to each of the plurality of switching nodes a corresponding drop rate signature for specifying a corresponding instantaneous packet drop rate, said drop rate signature at each of the plurality of switching nodes being orthogonal to said drop rate signature of all other ones of the plurality of switching nodes when each of said plurality of drop rate signatures are compensated for a DC offset;

setting a packet drop rate to said corresponding instantaneous packet drop rate;

perturbing said data transmission at perturbation intervals by intentionally dropping a number of packets by time varying said corresponding instantaneous packet drop rate; and estimating the responsiveness to packet drops from a perturbed packet transmission rate measured subsequent to said intentional packet dropping.

2. The method for determining the responsiveness to packet drops as recited in claim 1, wherein said responsiveness estimation step includes the steps of:

providing a responsiveness quantity as an output filter at each of the plurality of switching nodes, said output filer being a function of said corresponding instantaneous packet drop rate calculated over durations of said perturbation intervals, said output filter being further affected by a responsive portion of the flows respectively traversing through said each switching node; and applying said output filter to said perturbed packet transmission rate, said output filter providing at an output thereof said estimation of the responsiveness to packet drops corresponding to said data transmission.

3. The method for determining the responsiveness to packet drops as recited in claim 2, whereby said responsiveness estimation step further includes the step of compensating said drop rate signature for said DC offset prior to said output filter applying step.

4. The method for determining the responsiveness to packet drops as recited in claim 3, whereby said drop rate signature is a temporal waveform having a sinusoidal profile.

5. The method for determining the responsiveness to packet drops as recited in claim 3, whereby said drop rate signature is a temporal waveform having a substantially rectangular profile.

6. The method for determining the responsiveness to packet drops as recited in claim 5, whereby said rectangular temporal waveform is controlled by a pattern of binary-valued bits by which a bit thereof in a first bit state sets said instantaneous drop rate to a predetermined drop rate and a bit thereof in a second bit state sets said instantaneous drop rate to zero.

7. The method for determining the responsiveness to packet drops as recited in claim 6, whereby said pattern of binary-valued is selected by a code division multiple access code selection algorithm.

8. The method for determining the responsiveness to packet drops as recited in claim 2, further comprising, after said responsiveness estimation step, the step of estimating a non-conforming proportion of said data transmission, said non-conforming proportion estimating step including the steps of:
- calculating a long time average of said responsiveness quantity by averaging said output filter over a plurality of responsiveness measurements; and
- subtracting said responsiveness quantity from said long time average and dividing the result of said subtraction by said long time average.

9. A method for determining the responsiveness of a data transmission rate of data packets to packet drops in a communication network, each of the data packets having appended to data thereof a packet designator including an address of a source node and an address of a destination node, each of the data packets being assigned to a corresponding one of a plurality of flows such that the packet designators of the data packets in each of the plurality of flows have equivalent corresponding source node addresses and equivalent corresponding destination node addresses, the communication network including a plurality of switching nodes having a set of the plurality of flows respectively traversing therethrough, the method comprising the steps of:
- selecting, at each of the plurality of switching nodes, at least one aggregating property;
- forming a respective aggregate from the set of flows at each of the plurality of switching nodes in accordance with a corresponding one of said at least one aggregating property;
- setting a packet drop rate for each of said respective aggregates;
- dropping from each of said respective aggregates a number of packets according to said packet drop rate;
- measuring a perturbed packet transmission rate for each of said respective aggregates subsequent to said packet dropping step; and
- estimating the responsiveness to packet drops of each of said respective aggregates from said perturbed packet transmission rate, wherein said packet drop rate setting step further includes the steps of:
- assigning to each of the plurality of switching nodes a corresponding drop rate signature for specifying an instantaneous drop rate, said drop rate signature at each of the plurality of switching nodes being orthogonal to said drop rate signature of all other ones of the plurality of switching nodes when each of said plurality of drop rate signatures are compensated for a DC offset; and
- setting said packet drop rate to said instantaneous drop rate.

10. The method for determining the responsiveness to packet drops as recited in claim 9, further including the step of providing the packet designator with a source port number and a destination port number.

11. The method for determining the responsiveness to packet drops as recited in claim 9, whereby said aggregating property is selected from the group consisting of a source port number, a destination port number and a network application as determined from said source port number or said destination port number.

12. A method for determining an amount of traffic in a communication network non-conforming to a predetermined transmission control protocol, the traffic being transported in flows of data packets, each of the data packet having appended to data thereof a packet designator including an address of a source node and an address of a destination node, each of the data packets being assigned to a corresponding one of a plurality of flows such that the packet being assigned to a corresponding one of a plurality of flows such that the packet designators of the data packets in each of the plurality of flows have equivalent corresponding source node addresses and equivalent corresponding destination node addresses, the communication network including a plurality of switching nodes having a set of the plurality of flows respectively traversing therethrough, the method comprising the steps of:
- selecting at each of the plurality of switching nodes at least one aggregating property;
- forming a respective aggregate from the set of flows at each of the plurality of switching nodes in accordance with a corresponding one of said at least one aggregating property;
- setting a packet drop rate for each of said respective aggregates;
- dropping from each of said respective aggregates a number of packets according to said packet drop rate;
- measuring a perturbed packet transmission rate for each of said respective aggregates subsequent to said packet dropping step;
- estimating a responsiveness coefficient of each of said respective aggregates from said perturbed packet transmission rate;
- maintaining an average of said responsiveness coefficient for each of said respective aggregates as a nominal responsiveness coefficient; and
- calculating the amount of non-conforming traffic as a ratio of said responsiveness coefficient to said nominal responsiveness coefficient, wherein said packet drop rate setting step further includes the steps of:
- assigning to each of the plurality of switching nodes a corresponding drop rate signature for specifying an instantaneous drop rate, said drop rate signature at each of the plurality of switching nodes being orthogonal to said drop rate signature of all other ones of the plurality of switching nodes when each of said plurality of drop rate signatures are compensated for a DC offset; and
- setting said packet drop rate to said instantaneous drop rate.

13. The method for determining an amount of non-conforming traffic as recited in claim 12, whereby said responsiveness coefficient estimation step includes the steps of:
- providing an output filter at each of the plurality of switching nodes, said output filter responsive only to said drop rate signature assigned thereto; and
- applying said output filter to said perturbed packet transmission rate corresponding to each of said respective aggregates, said output filer providing at an output thereof said estimation of said responsiveness coefficient corresponding to each of said respective aggregates.

14. The method for determining an amount of non-conforming traffic as recited in claim 13, whereby said responsiveness coefficient estimation step further includes the step of compensating said drop rate signature for said DC offset prior to said output filter applying step.

15. The method for determining an amount of non-conforming traffic as recited in claim 14, whereby said drop rate signature is a temporal waveform having a sinusoidal profile.

16. The method for determining an amount of non-conforming traffic as recited in claim 14, whereby said drop rate signature is a temporal waveform having a substantially rectangular profile.

17. The method for determining an amount of non-conforming traffic as recited in claim 16, whereby said rectangular temporal waveform is controlled by a pattern of binary-valued bits by which a bit thereof in a first bit state sets said instantaneous drop rate to a predetermined drop rate and a bit thereof in a second bit state sets said instantaneous drop rate to zero.

18. The method for determining an amount of non-conforming traffic as recited in claim 17, whereby said pattern of binary-valued is selected by a code division multiple access code selection algorithm.

19. The method for determining an amount of non-conforming traffic as recited in claim 12, further including the step of providing the packet designator with a source port number and a destination port number.

20. The method for determining an amount of non-conforming traffic as recited in claim 12, whereby said aggregating property is selected from the group consisting of a source port number, a destination port number and a network application as determined from said source port number or said destination port number.

* * * * *